US010084888B2

(12) United States Patent
Lee (10) Patent No.: US 10,084,888 B2
(45) Date of Patent: Sep. 25, 2018

(54) METHOD AND APPARATUS FOR ACCELERATING WEB SERVICE WITH PROXY SERVER

(71) Applicant: Samsung Electronics Co., Ltd, Gyeonggi-do (KR)

(72) Inventor: Ji-Cheol Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 14/063,988

(22) Filed: Oct. 25, 2013

(65) Prior Publication Data
US 2014/0122578 A1 May 1, 2014

(30) Foreign Application Priority Data
Oct. 25, 2012 (KR) ........................ 10-2012-0119134

(51) Int. Cl.
*H04L 29/06* (2006.01)
*H04L 29/08* (2006.01)

(52) U.S. Cl.
CPC .......... *H04L 67/42* (2013.01); *H04L 63/0281* (2013.01); *H04L 63/0428* (2013.01); *H04L 67/02* (2013.01); *H04L 67/2809* (2013.01); H04L 63/0823 (2013.01); H04L 63/166 (2013.01); H04L 67/2842 (2013.01)

(58) Field of Classification Search
CPC .............. G06F 21/33; H04L 29/06945; H04L 29/06965; H04L 63/0281; H04L 63/0428; H04L 63/0823; H04L 63/0884; H04L 63/16; H04L 63/166; H04L 63/04; H04L 63/0435; H04L 63/0485; H04L 63/08; H04L 63/0442; H04L 63/0445;
(Continued)

(56) References Cited

U.S. PATENT DOCUMENTS 6,643,774 B1* 11/2003 McGarvey .......... H04L 63/0823
380/259
7,055,028 B2* 5/2006 Peiffer ................ H04L 63/0281
713/151
(Continued)

FOREIGN PATENT DOCUMENTS

EP 2369808 A1 9/2011
KR 10-2010-0026152 3/2010
WO WO 2002/031668 A1 4/2002

OTHER PUBLICATIONS

Apostolopoulos et al., "Transport Layer Security: How much does it really cost?" Proceedings of the Eighteenth Annual Joint Conference of the IEEE Computer and Communications Societies, vol. 2, Mar. 1999, pp. 717-725.*

(Continued)

*Primary Examiner* — Vivek Srivastava
*Assistant Examiner* — William C Mcbeth (57) ABSTRACT

A method provides a web service. The method includes obtaining authentication information of at least one web server from the at least one web server to establish a session in advance and storing the authentication information in a database; searching the database for authentication information of a particular web server, upon reception of a request from a client for access to the particular web server; and performing web server access acceleration if the particular web server exists.

13 Claims, 5 Drawing Sheets

(58) Field of Classification Search
CPC ..... H04L 67/02; H04L 67/28; H04L 67/2809; H04L 67/2842; H04L 67/42
USPC ........ 709/203, 217, 219, 227, 228; 713/150, 713/151, 153, 168, 169, 170, 171, 175; 726/12
See application file for complete search history.

(56) References Cited

U.S. PATENT DOCUMENTS

| | | | |
|---|---|---|---|
| 7,584,500 B2* | 9/2009 | Dillon | H04L 63/0464 713/151 |
| 8,190,875 B2* | 5/2012 | Lev Ran | H04L 63/061 713/150 |
| 8,281,029 B2* | 10/2012 | Chatterjee | H04L 63/0428 709/235 |
| 2001/0016907 A1* | 8/2001 | Kang | H04L 63/0428 713/152 |
| 2003/0112772 A1* | 6/2003 | Chatterjee | H04L 67/288 370/316 |
| 2004/0015725 A1* | 1/2004 | Boneh | H04L 63/0281 713/160 |
| 2004/0093406 A1 | 5/2004 | Thomas et al. | |
| 2005/0080876 A1 | 4/2005 | Peiffer et al. | |
| 2005/0102514 A1* | 5/2005 | Bergenwall | H04L 63/164 713/168 |
| 2005/0273850 A1* | 12/2005 | Freund | H04L 63/0823 726/14 |
| 2007/0038853 A1* | 2/2007 | Day | H04L 63/0428 713/153 |
| 2007/0074282 A1* | 3/2007 | Black | H04L 63/166 726/14 |
| 2007/0180510 A1* | 8/2007 | Long | H04L 63/0823 726/10 |
| 2008/0046727 A1* | 2/2008 | Kanekar | H04L 63/166 713/168 |
| 2008/0126794 A1* | 5/2008 | Wang | H04L 63/0823 713/151 |
| 2008/0134311 A1* | 6/2008 | Medvinsky | H04L 29/06965 726/7 |
| 2008/0306875 A1* | 12/2008 | Mardikar | H04L 63/061 705/71 |
| 2009/0083538 A1* | 3/2009 | Merugu | H04L 63/0823 713/153 |
| 2009/0132808 A1 | 5/2009 | Baentsch et al. | |
| 2009/0210712 A1* | 8/2009 | Fort | H04L 63/1441 713/175 |
| 2009/0271613 A1 | 10/2009 | Brabson | |
| 2010/0191856 A1* | 7/2010 | Gupta | H04L 61/1511 709/228 |
| 2010/0235521 A1 | 9/2010 | French | |
| 2011/0154017 A1* | 6/2011 | Edstrom | H04L 63/0823 713/151 |
| 2011/0191442 A1* | 8/2011 | Ovsiannikov | H04L 63/166 709/228 |
| 2011/0231651 A1* | 9/2011 | Bollay | H04L 63/166 713/152 |
| 2012/0265991 A1 | 10/2012 | Kanekar et al. | |
| 2013/0031356 A1* | 1/2013 | Prince | H04L 63/0823 713/151 |
| 2013/0080512 A1* | 3/2013 | Yasuda | H04L 12/66 709/203 |
| 2013/0198825 A1 | 8/2013 | Feytons | |
| 2014/0067996 A1* | 3/2014 | Zhang | H04L 63/0428 709/227 |
| 2014/0095865 A1* | 4/2014 | Yerra | H04L 63/0823 713/156 |
| 2015/0106624 A1* | 4/2015 | Gero | H04L 63/0442 713/171 |
| 2016/0119287 A1* | 4/2016 | Khazan | H04L 63/0281 726/12 |

OTHER PUBLICATIONS

"How TLS/SSL Works" Microsoft Technet, updated Mar. 28, 2003, <https://technet.microsoft.com/en-us/library/Cc783349(v=WS.10).aspx>, accessed Aug. 28, 2015.*
Stark et al., "The Case for Prefetching and Prevalidating TLS Server Certificates", NDSS, Feb. 2012.*
International Search Report dated Jan. 28, 2014 in connection with International Patent Application No. PCT/KR2013/009596, 3 pages.
Written Opinion of the International Searching Authority dated Jan. 28, 2014 in connection with International Patent Application No. PCT/KR2013/009596, 5 pages.
Dr. M. Thangaraj, et al., "Prefetching: A Survey", International Journal of Computer Science and Technology, vol. 2, Issue 2, Jun. 2, 2011, 6 pages.
European Search Report dated Jun. 2, 2016 in connection with European Application No. 13848954.7, 6 pages.
A. Langley, et al., "Transport Layer Security (TLS) False Start; Draft-bmoeller-tls-falsestart.00.txt", Internet Engineering Task Force, IETF; Standard Working Draft, Internet Society (ISOC) 4, Rue des Falaises, CH-1205, Geneva, Switzerland, Jun. 2, 2010, 11 pages.

* cited by examiner

METHOD AND APPARATUS FOR ACCELERATING WEB SERVICE WITH PROXY SERVER

CROSS-REFERENCE TO RELATED APPLICATION(S) AND CLAIM OF PRIORITY

The present application is related to and claims the benefit under 35 U.S.C. § 119(a) to Korean Patent Application Serial No. 10-2012-0119134, which was filed in the Korean Intellectual Property Office on Oct. 25, 2012, the entire disclosure of which is hereby incorporated by reference.

TECHNICAL FIELD

The present disclosure relates to a method and apparatus for providing an accelerated web service for client using a proxy server.

BACKGROUND

In general, in order to safely receive web pages or Hyper Text Transfer Protocol (HTTP) data from a web server, a client has to perform predetermined preliminary procedures. Such preliminary procedures each require at least one Round Trip Time (RTT) to exchange messages between the client and the web server.

If the web server accessible on the Internet is far distant from the client that requests a service, then a Transmission Control Protocol (TCP) connection setup procedure performed between the web server and the client, which is one of the preliminary procedures, takes significant time.

Furthermore, it is also time-consuming for a web browser of the client to connect to multiple HTTP servers from multiple domains and obtain respective web pages.

Thus, a method for providing a client with accelerated web services is required.

SUMMARY

To address the above-discussed deficiencies, it is a primary object to provide a method and apparatus for providing an accelerated web service by simplifying procedures of providing web services to a client with a proxy server.

In accordance with an aspect of the present disclosure, provided is a method for providing a web service. The method includes obtaining authentication information of at least one web server from the at least one web server to establish a session in advance and storing the authentication information in a database; searching the database for authentication information of a particular web server, upon reception of a request from a client for access to the particular web server; and performing web server access acceleration if the particular web server exists.

In accordance with another aspect of the present disclosure, provided is a method for receiving a web service. The method includes sending a request for access to a particular web server, and receiving authentication information of the particular web server and a random number through a proxy server; performing authentication on the particular web server based on the authentication information of the particular web server and the random number, and generating encrypted web page request information based on a result of performing the authentication; and sending the result of performing the authentication and the encrypted web page request information to the proxy server.

In accordance with another aspect of the present disclosure, provided is a method for providing a web service in a web server. The method includes receiving from a proxy server that establishes a session in advance a result of authentication of the web server performed by a client that requests access to the web server, and web page request information encrypted based on the result of authentication; creating response information to the web page request information; and encrypting the response information with the result of authentication and sending the encrypted response information to the proxy server.

In accordance with another aspect of the present disclosure, provided is a proxy server for providing a web service. The proxy server includes a database configured to obtain and store authentication information of at least one web server from the at least one web server to establish a session in advance. The proxy server further includes a web server access acceleration determiner configured to search the database for authentication information of a particular web server upon reception of a request for access to the particular web server; and to perform web server access acceleration if the authentication of the particular web server exists.

In accordance with another aspect of the present disclosure, provided is a terminal for receiving a web service. The terminal includes a transceiver configured to send a request for access to a particular web server, and to receive authentication information of the particular web server and a random number through a proxy server. The terminal further includes a controller configured to perform authentication on the particular web server based on the authentication information of the particular web server and the random number; to create web page request information encrypted based on a result of performing the authentication; and to control the transceiver to send the proxy server the result of performing the authentication and the encrypted web page request information.

In accordance with another aspect of the present disclosure, provided is a web server for providing a web service. The web server includes a transceiver configured to receive, from a proxy server that establishes a session in advance a result of authentication of the web server performed by a client that requests access to the web server, web page request information encrypted based on the result of authentication. The web server further includes a controller configured to create response information to the web page request information; to encrypt the response information based on the result of authentication; and to control the transceiver to send the encrypted response information to the proxy server.

Other aspects, advantages, and salient features of the disclosure will become apparent to those skilled in the art from the following detailed description, which, taken in conjunction with the annexed drawings, discloses embodiments of the invention Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The disclosure references the accompanying drawings, in which illustrative embodiments of the disclosure are shown. Embodiments of the present disclosure may take many different forms and the disclosure is not limited to the embodiments set forth herein; rather, these embodiments are provided so that this disclosure will be thorough and complete, and will fully convey the scope of the disclosure to those skilled in the art. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the disclosure.

It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
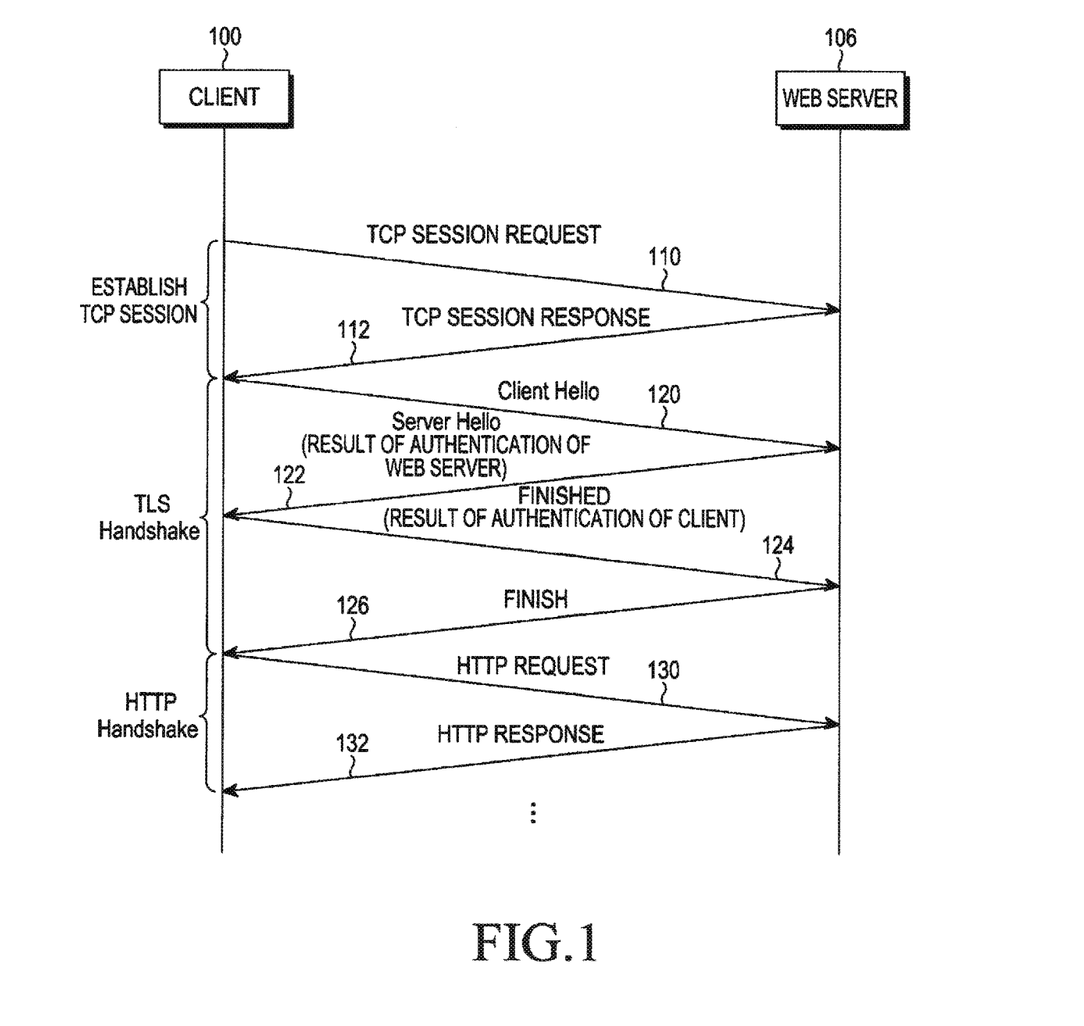
FIG. 1 is a signaling chart illustrating conventional operations for web server connection.

FIG. 1 is a signaling chart illustrating conventional operations for web server connection. It is assumed herein that a User Equipment (UE) on a client 100 side (hereinafter, briefly called client 100) has completed an initial attach procedure with a mobile communication network that includes, e.g., a Remote Area Network (RAN) and a gateway (GW).

Referring to FIG. 1, the client 100 performs a Transmission Control Protocol (TCP) session setup procedure, a Transport Layer Security (TLS) procedure, and a Hyper Text Transfer Protocol (HTTP) handshake procedure to access a web server 106.

First, the TCP session setup procedure is performed for the client 100 to send the web server 106 a connection request. Specifically, in step 110, the client 100 sends a TCP session request to the web server 106. In step 112, the web server 106 sends the client 100 a TCP session response to the TCP session request.

Next, the TLS handshake procedure is performed to establish a Secure Socket Layer (SSL) session for guaranteeing privacy of transactions with the web server 106. Specifically, once the SSL session is established, the client 100 can authenticate a website provided by the web server 106, encrypt data to be exchanged between the client 100 and the web server 106, prevent data modification during data communication, and so on. More specifically, in step 120, the client 100 sends the web server 106 a client hello message to request the SSL session setup. The client hello message includes information that can be requested by the web server 106 for the SSL session setup. For example, the client hello message includes the SSL version number of the client 100, cipher settings, SSL session related session-specific data, etc. The SSL version number is a random number that is randomly generated by the client 100.

Similarly, in step 122, the web server 106 sends the client 100 a server hello message in response to the client hello message. The server hello message also includes information requested by the client 100 for the SSL session setup. For example, the server hello message includes the SSL version number of the web server 106, cypher settings, SSL session-specific data, etc. The SSL version number of the web server 106 is also a random number that is randomly generated by the web server 106.

Then, in step 124, the client 100 authenticates the web server 106 via the information obtained in step 122. If the authentication of the web server 106 is failed, the client 100 notifies the web server 106 that, as the authentication result, it is impossible to support the SSL. In this embodiment, it is assumed that the authentication of the web server 106 has been successfully completed. In this case, in step 124, the client 100 creates a Pre-Master Key (Pre-MK) for the SSL session and encrypts the Pre-MK with a public key of the web server 106, which is obtained from a certificate of the web server 106. In addition, the client 100 creates a master key and a credential as the authentication results of the client 100 via the encrypted Pre-MK and the SSL version number of the web server 106. Furthermore, the client 100 sends the authentication result of the client 100 to the web server 106 together with a Finished message indicating that the client 100 has completed the TLS handshake procedure.

In step 126, based on the authentication results of the client 100, the web server 106 encrypts the Finished message and sends the encrypted Finished message to the client 100.

With steps 110 to 126 completed, an SSL session is set up between the client 100 and the web server 106. The client 100 then performs the HTTP handshake procedure in the SSL session to request and obtain a desired web address. Specifically, in step 130, the client 100 sends the web server 106 a web address request in an HTTP request message in the SSL session. In step 132, the web server 106 sends the client 100 an HTTP response message that includes the web address.

After this, although not shown in FIG. 1, the client 100 can perform a procedure to obtain desired web pages from the web server 106 based on the web address, and steps 130 to 132 can be repeated if desired by the client 100.

Consequently, in order for a client to get a desired web service, typical procedures for web server connection have had to be performed, as shown in FIG. 1. The present disclosure provides a method for providing an accelerated web service by introducing a proxy server to simplify such typical procedures for web server connection.

Figure 2A:
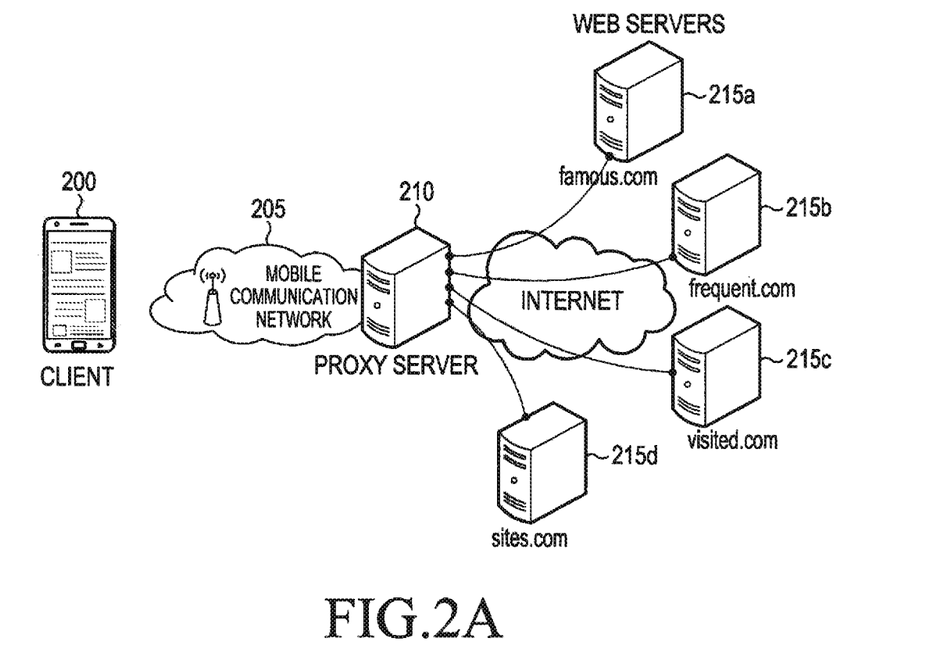
FIG. 2A illustrates a system for providing web services, according to embodiments of the present disclosure.

FIG. 2A illustrates a system for providing web services, according to embodiments of the present disclosure.

Referring to FIG. 2A, the system includes, e.g., a client 200 to get a particular web service, a mobile communication network 205, a proxy server 210, and multiple web servers 215a-215d that provide various web services. The web servers 215a to 215d each include a web server 215 with a typical site address for providing users with typical web-based services, e.g., search engine services, buying services, banking services, etc., a web server 215b having high frequency of access from the client 200, a web server 215c most recently accessed by the client 200, and a web server 215d for providing other particular services.

For convenience of explanation, it is assumed that the client 200 has performed the initial attach procedure with the mobile communication network 205 and is connected to the mobile communication network 205 with a terminal accessible to the mobile communication network 205 to receive a particular web service.

The proxy server 210 has already established a session with the terminal of the client 200 (briefly referred to as client 200) over the mobile communication network 205 and web servers 215a to 215d on the Internet, and simplifies the TLS and HTTP procedures by taking the place of parts of the client 200 and web servers 215a to 215d to access the web server. In FIG. 2A, the proxy server 210 is illustrated to be within the mobile communication network 205. However, in other embodiments, the proxy server 210 can be located outside of the mobile communication network 205.

Figure 2B:
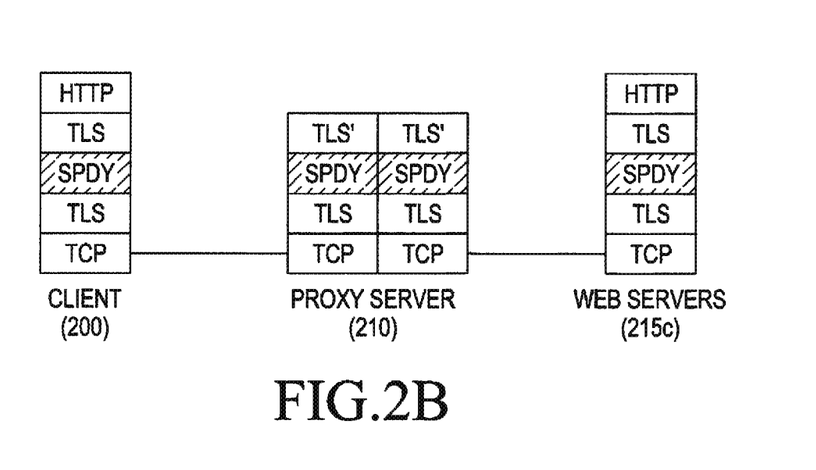
FIG. 2B illustrates protocol stacks of constituent elements of a system for providing web services, according to embodiments of the present disclosure.

FIG. 2B illustrates protocol stacks of constituent elements of the system for providing web services, according to embodiments of the present disclosure.

Referring to FIG. 2B, respective protocol stacks of the client 200, the proxy server 210, and one of the web servers 215a to 251d, e.g., the web server 215c have TCP, TLS, SPDY (SPeeDY) and TLS layers. The protocol stacks of the client 200 and web server 215c further include HTTP layers on their top.

In an embodiment of the present disclosure, the protocol stacks of the client 200, proxy server 210 and web server 215c have the SPDY layer between TLS layers in common. That is, in the embodiment of the present disclosure, the SPDY protocol is used to reduce transmission latency. The SPDY layer is used for the proxy server 306 to obtain authentication information of at least one of the web servers 215a to 215d in advance by establishing an SPDY based session with the at least one web server before the client 200 sends a new web connection request. Detailed operations of the proxy server 210 will be described later in connection with FIG. 3. The SPDY protocol is illustrated herein by way of example, but in other embodiments any other protocol can be used.

Figure 3:
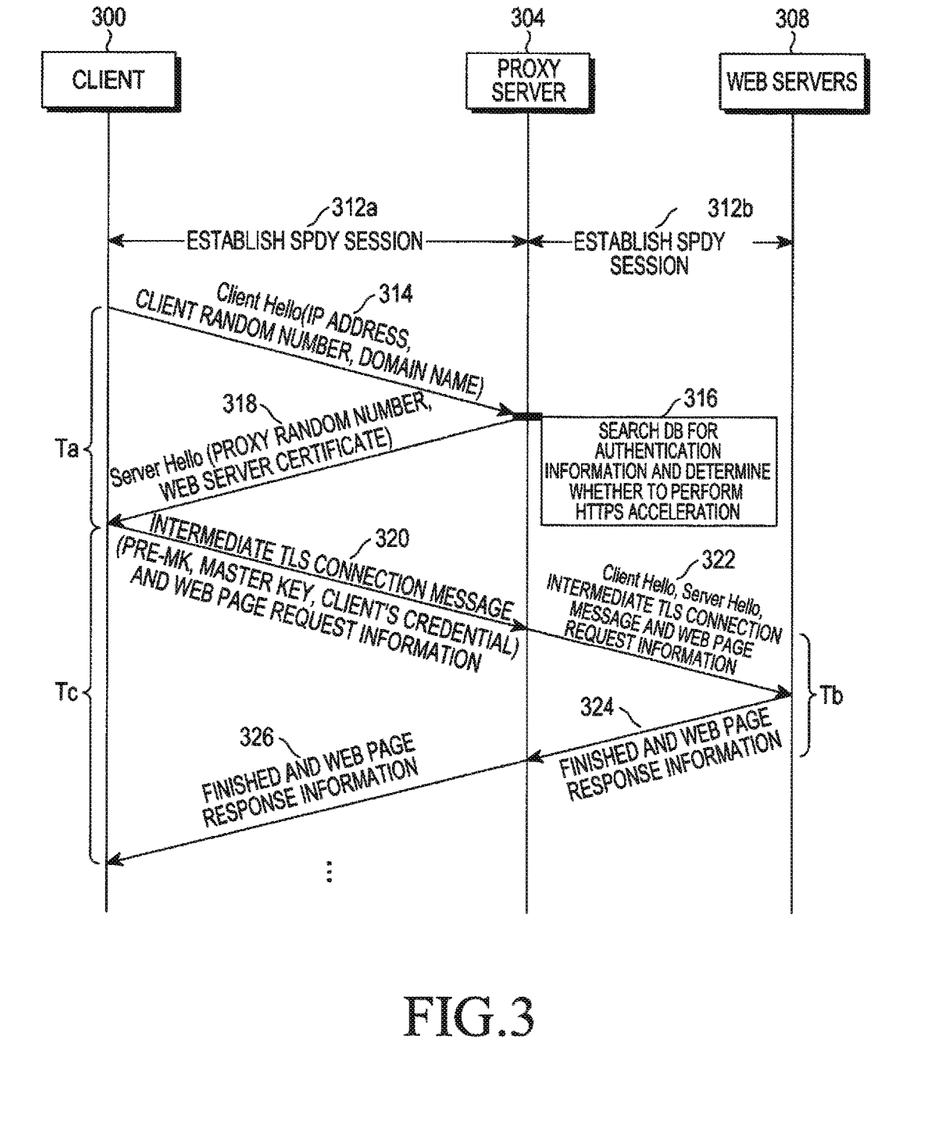
FIG. 3 is a signaling chart illustrating operations for web server connection, according to embodiments of the present disclosure.

FIG. 3 is a signaling chart illustrating operations for web server connection, according to embodiments of the present disclosure. It is assumed herein that a client 300 has performed the initial attach procedure with a mobile communication network with, e.g., RAN and GW.

After the initial attach procedure, referring to FIG. 3, it is assumed that in steps 312a and 312b, the client 300 has established a session with a web server 308 through a proxy server 304. For example, the session is assumed to be an SPDY session that operates based on the SPDY protocol introduced for transmission latency. In certain embodiments, other sessions based on other protocols than the SPDY protocol can be used.

For convenience of explanation, the proxy server 304 is illustrated herein to establish a session with one web server, the web server 308. However, the proxy server 304 can establish sessions with multiple web servers in advance. The proxy server 304 has not yet obtained information about a web service to be requested by the client 300. Thus, the proxy server 304 can obtain web server access history of the client 300, and establish sessions in advance after selecting web servers based on the web server access history or after arbitrarily selecting web servers that provide typical web-based services. The web server access history includes information regarding a web server with high frequency of access of the client 300 relative to a threshold value, a web server most recently accessed by the client 300, a web server estimated from a URL included in content of a web page previously accessed by the client 300, or the like. The proxy server 304 establishes an SPDY session with the selected web servers. By doing this, the client 300 may not have to perform the TCP session setup procedure otherwise involved in a new web access request. Accordingly, time for the TCP session setup can be reduced.

In step 312b, the proxy server 304 obtains and stores authentication information of the selected web servers while establishing the SPDY session with them. Specifically, for example, while setting up the SPDY session with the web server 308, the proxy server 304 obtains and stores authentication information of the web server 308. In connecting first TLS layers polled between the proxy server 304 and the web server 308 in the SPDY session setup procedure, the proxy server 304 obtains and stores a certificate of the web server 308 as the authentication information while connecting its TLS layer located under its SPDY layer in its protocol stack as shown in FIG. 2B to the TLS layer of the web server 308, which is also located under the SPDY layer in the protocol stack of the web server 308, as shown in FIG. 2B. That is, the proxy server 304 obtains and stores certificates of the selected web servers as the authentication information in the procedure of connecting first TLS layers therebetween. The proxy server 304 maps server information, such as Internet Protocol (IP) addresses and domain names of the web servers whose first TLS layers are connected to the first TLS of the proxy server 304 to their respective certificates, and stores the mapping results in an authentication information database (DB).

In step 314, for example, the client 300 sends the proxy server 304 a client hello message to request setup of a new TLS session with the web server 308. The new TLS session refers to a connection among TLS layers above their respective SPDY layers in their respective protocol stacks of the client 300, the proxy server 304, and the web server 308, as shown in FIG. 2B. The client hello message includes information regarding the web server 308 to be connected by the client 300, such as IP address and domain name of the web server 308, a random number randomly assigned by the client 300 (hereinafter, referred to as a 'client random number'), etc.

In step 316, the proxy server 304 searches its authentication information DB for the certificate of a web server, i.e., the web server 308 matched to the IP address or domain name. If the certificate of the web server 308 is searched for in the authentication information DB, the proxy server 304 performs a Hypertext Transfer Protocol over Secure Socket Layer (HTTPS) acceleration function according to an embodiment of the present disclosure. The HTTPS acceleration function helps simplify the web server access procedure by introducing the proxy server 304, thus reducing time consumption for the web server access procedure.

In step 318, the proxy server 304 sends the client 300 a server hello message that includes the certificate of the web server 308 searched for in the authentication information DB and a random number randomly created by the proxy server 304 (hereinafter, referred to as a 'proxy random number'). The proxy random number represents a replacement value for the SSL version number created by the web server as illustrated in step 122 of FIG. 1.

In step 320, the client 300 creates a Pre-MK with the proxy random number and the certificate of the web server 308. The client 300 then encrypts the Pre-MK with a public key included in the certificate of the web server 308. The client 300 creates a master key and a credential (hereinafter, referred to as 'client authentication information') with the encrypted Pre-MK and the proxy random number. The client 300 sends the proxy server 304 an intermediate TLS connection message that includes the master key and the client authentication information. The client 300 then creates an HTTP header and HTTP body encrypted with the master key and sends them to the proxy server 304 with the intermediate TLS connection message. The HTTP header and HTTP body are information regarding a web page that the client 300 wishes to obtain from the web server 308 (hereinafter, called 'web page request information').

In step 322, the proxy server 304 forwards the web server 308 the HTTP header and HTTP body with the client hello message, server hello message, and the intermediate TLS connection message in the ongoing SPDY session. The proxy server 304 creates an HTTP accelerator indicator to indicate that HTTPS acceleration function is performed, and sends the web server 308 the HTTP accelerator indicator with the aforementioned messages and the HTTP header and HTTP body.

In step 324, the web server 308 decrypts the Pre-MK obtained from the intermediate TLS connection message with a private key paired with the certificate of the web server 308, and then creates a master key with the decrypted Pre-MK, the client random number, and the proxy random number. The web server 308 determines whether the credential created by the client 300 matches a credential included in the certificate of the web server 308. If the credentials match each other, the web server 308 reconstruct an HTTP request by decrypting the HTTP header and HTTP body with the master key. The web server 308 creates an HTTP response to the reconstructed HTTP request by performing an HTTP server function. The web server 308 encrypts the HTTP response with the master key. The web server 308 sends the proxy server 304 the HTTP response encrypted with the master key, and a Finished message to indicate that the TLS connection has been completed. In step 326, the proxy server 304 sends the client 300 the Finished message with the HTTP response encrypted with the master key.

The client 300 determines from the Finished message that TLS connection with the web server 308 has been completed, and decrypts the HTTP response message with the master key created in step 320.

Although not shown in FIG. 3, the client 300 can repeat sending a new web page request to the web server 308 on request and receiving a response from the web server 308 to the new web page request.

Figure 4:
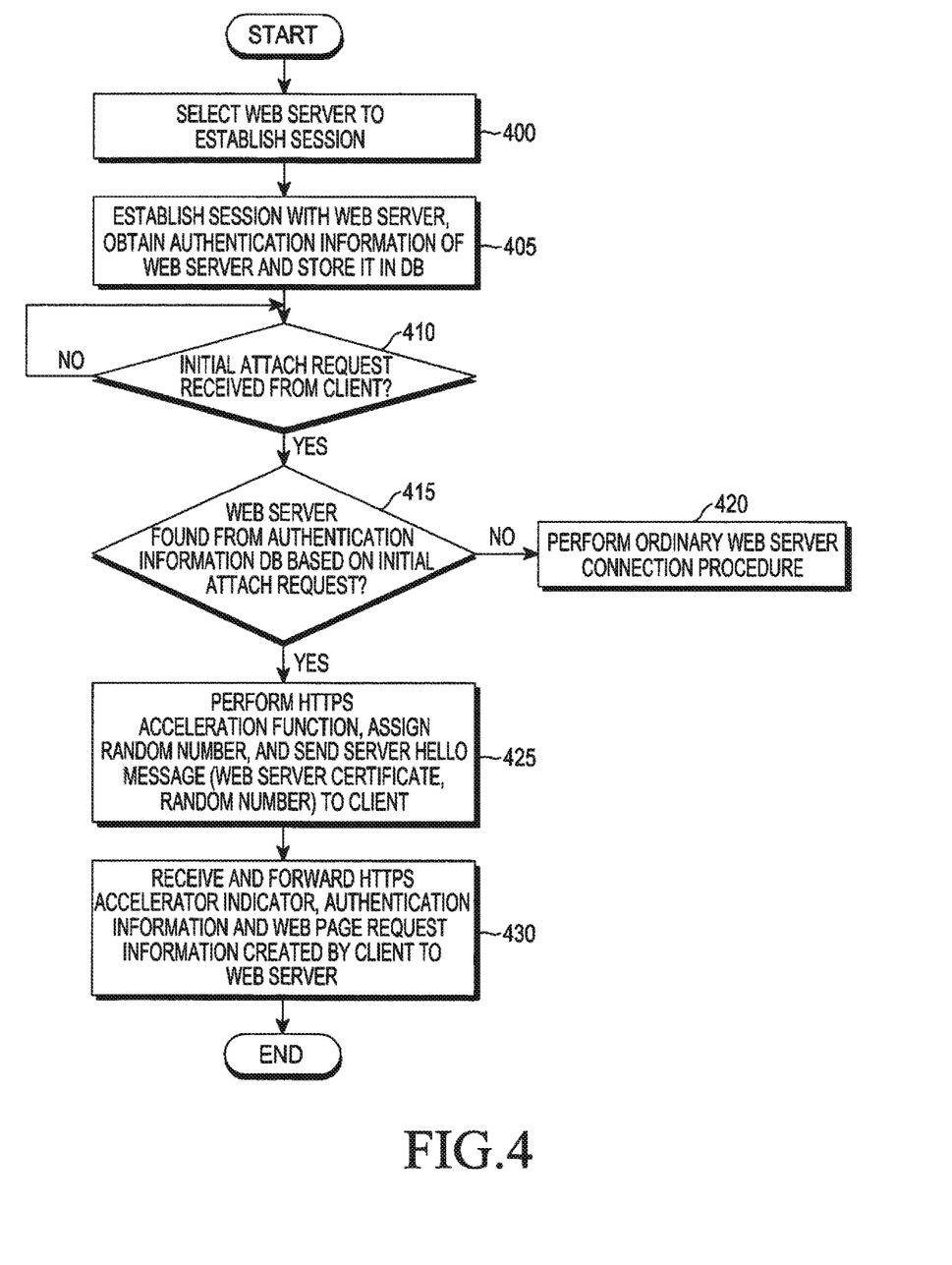
FIG. 4 is a flowchart illustrating operations of a proxy server, according to embodiments of the present disclosure.

FIG. 4 is a flowchart illustrating operations of the proxy server, according to embodiments of the present disclosure.

Referring to FIG. 4, in step 400, the proxy server selects at least one web server to establish a session before a new web access is requested by the client. Specifically, the proxy server selects at least one web server based on a web access history of the client, which is obtained over the mobile communication network, or selects at least one web server that provides typical web-based service.

In step 405, the proxy server establishes a session with the selected at least one web server, obtains authentication information of the web server during the session setup procedure, and stores the authentication information of the web server in its authentication information DB. The session established between the proxy server and the web server can be, e.g., an SPDY session that operates based on the SPDY protocol. The authentication information DB is managed by mapping server information, such as an IP address, domain name, etc. of the web server to a certificate of the web server for each authentication information obtained during the session setup procedure.

In step 410, the proxy server checks if a client hello message to request initial access to the web server has been received from the client. If the client hello message has not been received, the proxy server waits until reception of the client hello message.

If the client hello message has been received, in step 415, the proxy server determines whether to perform an HTTPS acceleration function. That is, the proxy server searches its authentication information DB for a web server to be accessed based on the client hello message. The client hello message includes an IP address and domain name of the web server, and a client random number. If there is no web server to be accessed in the authentication information DB, in step 420, the proxy server performs an ordinary web server access procedure. That is, as shown in FIG. 1, the proxy server only serves to relay the client message received from the client to the web server. The ordinary web server access procedure was described in connection with FIG. 1, so the description will be omitted herein.

If there is a web server to be accessed in the authentication information DB, in step 425, the proxy server performs the HTTPS acceleration function, assigns a proxy random number in the place of the web server, and sends a server hello message to the client. The sever hello message includes a certificate of the web server, which is obtained from the authentication information DB, and the proxy random number.

In step 430, the proxy server creates an HTTP accelerator indicator, and sends the web server the HTTP accelerator indicator, client authentication information received from the client, and web page request information, simultaneously. The client authentication information includes a Finished message encrypted with a master key and a Pre-MK encrypted with a public key of the web server. The master key is created with the Pre-MK created using the proxy random number and the certificate of the web server, a client random number, and the proxy random number. The web page request information includes an HTTP header and body encrypted with the master key. The proxy server forwards the client a response to the web page request, which is received from the web server.

Figure 5:
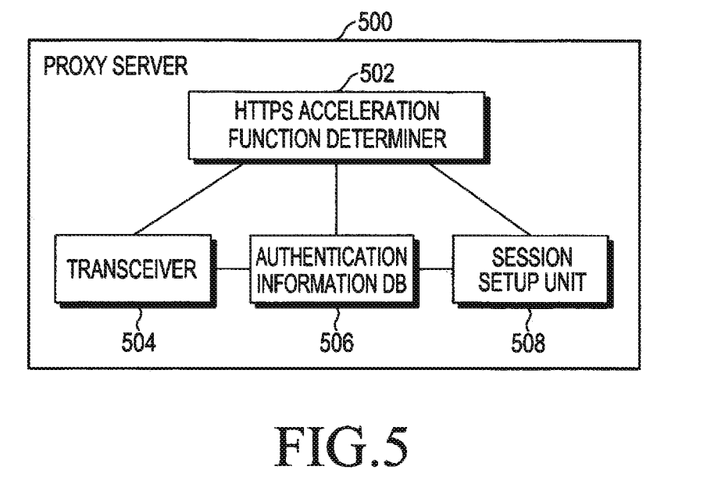
FIG. 5 is a schematic block diagram illustrating a proxy server, according to embodiments of the present disclosure.

FIG. 5 is a schematic block diagram illustrating a proxy server 500, according to embodiments of the present disclosure.

Referring to FIG. 5, the proxy server 500 includes an HTTPS acceleration function determiner 502, a transceiver 504, an authentication information DB 506, and a session setup unit 508. The constituent elements of the proxy server 500 are classified by functions of an embodiment of the present disclosure, for convenience of explanation. However, in other embodiments of the present disclosure, they can be incorporated in a single unit or can be subdivided into sub units. The proxy server 500 can be installed inside of a mobile communication network or can be installed independently of the mobile communication network.

The session setup unit 508 selects at least one web server based on a web access history of a client, or selects at least one web server that provides typical web-based service, as the web server to establish a session before a new web access request is sent from the client. The session setup unit 508 then establishes a session with the selected at least one web server. The session established between the proxy server and the web server can be, e.g., an SPDY session that operates based on the SPDY protocol.

The authentication information DB 506 is managed by mapping a certificate of the at least one web server, which is obtained during the session setup procedure, to server information. The server information corresponds to, e.g., an IP address and/or domain name of the web server.

If the HTTPS acceleration function determiner 502 recognizes that the transceiver has received a client hello message from the client, it searches the authentication information DB 506 for a web server to be newly accessed based on the client hello message. If the web server is searched for in the authentication information DB 506, the HTTPS acceleration function determiner 502 performs the HTTPS acceleration function, and creates an HTTP accelerator indicator and assigns a proxy random number in the place of the web server. The transceiver 504 forwards a server hello message to the client under control of the HTTPS acceleration function determiner 502.

After that, if the transceiver 504 receives client authentication information and web page request information from the client, the HTTPS acceleration function determiner 502 controls the transceiver 504 to send the web server the HTTP accelerator indicator, the client authentication information, and the web page request information of the client, simultaneously. If the transceiver 504 receives a response to the web page request from the web server, the HTTPS acceleration function determiner 502 controls the transceiver 504 to forward the client the response to the web page request to the client.

Figure 6:
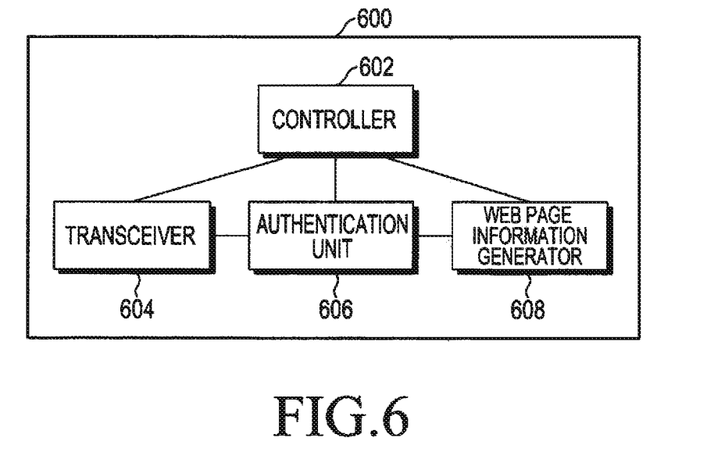
FIG. 6 is a schematic block diagram illustrating a client terminal or a web server, according to embodiments of the present disclosure.

FIG. 6 is a schematic block diagram illustrating a client terminal or web server 600, according to embodiments of the present disclosure. The constituent elements of the client terminal or web server 600 are classified by functions of embodiments of the present disclosure, for convenience of explanation. However, in other embodiments of the present disclosure, they can be incorporated in a single unit or can be subdivided into sub units.

Referring to FIG. 6, the terminal or web server 600 includes a controller 602, a transceiver 604, an authentication unit 606, and a web page information generator 608.

Assuming that the apparatus 600 operates as a client terminal (also called a client), the transceiver 604 sends the proxy server a client hello message for access to a new web server under control of the controller 602. The client hello message includes the same information as a typical client hello message. The transceiver 604 then receives a server hello message through the proxy server 306. The sever hello message includes a certificate of the web server indicated by the client hello message, and a proxy random number.

The authentication unit 606 creates a Pre-MK with the proxy random number and the certificate of the web server. The authentication unit 606 encrypts the Pre-MK with a public key included in the certificate of the web server, and creates a client certificate and a master key with the encrypted Pre-MK, the client random number, and the proxy random number. The controller 602 controls the transceiver 604 to send the proxy server an intermediate TLS connection message that includes the master key and the client certificate. The web page information generator 608 creates web page request information, i.e., HTTP header and HTTP body, encrypted with the master key. The controller 602 controls the transceiver 604 to send the proxy server the web page request information with the intermediate TLS connection message. The transceiver 604 receives a Finished message of the web server, which includes a response to the web page request information through the proxy server.

Next, it is assumed that the apparatus 600 operates as the web server.

The transceiver 604 receives the HTTP accelerator indicator, the client authentication information, and the web page request information through the proxy server, under control of the controller 602. The client authentication information includes the certificate of the client and the master key. The master key is created with the Pre-MK created using the proxy random number and the certificate of the web server, a client random number, and the proxy random number. The web page request information includes an HTTP header and body encrypted with the master key.

The web page information generator 608 creates a web page response to the web page request information, under control of the controller 602. The controller 602 encrypts the web page response with the master key, and controls the transceiver 604 to send the proxy server the encrypted web page response together with the Finished message.

If the transceiver has not received the HTTP accelerator indicator under control of the controller 602, the authentication unit 606 performs authentication based on information obtained from the client hello message received by the transceiver 604 and creates a server hello message as the authentication result.

As described above, according to embodiments of the present disclosure, since a proxy server supporting an HTTPS acceleration function is introduced, a client and a web server may not perform TCP session setup during the web access procedure and the client can send a web page request with its authentication information. Likewise, the web server may not send its authentication information directly to the client. Accordingly, the web access procedure can be simplified, thus reducing time consumption for the web access procedure.

According to various embodiments of the present disclosure, a response to an HTTPS request can be received as soon as secure Transport Layer Security (TLS) connection is made between a client and a web server using a proxy server, thus giving an advantage of reduced web page loading time.

Several embodiments have been described in connection with, e.g., mobile communication terminals, but a person of ordinary skill in the art will understand and appreciate that various modifications can be made without departing the scope of the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a web service by a proxy server, the method comprising:
   obtaining, by the proxy server, authentication information from each of a plurality of web servers, and storing the obtained authentication information of the plurality of the web servers in a database;
   receiving, from a terminal, an access request to a web server of the plurality of the web servers;
   retrieving, by the proxy server, corresponding authentication information of the web server from the stored authentication information of the plurality of the web servers in the database;
   generating, by the proxy server, a proxy random number representing a replacement value of a random number created by the web server;
   transmitting, to the terminal, the proxy random number and the corresponding authentication information of the web server;
   receiving, from the terminal, an intermediate message comprising client authentication information and web page request information encrypted with a terminal master key;
   forwarding, to the web server, the web page request information together with a hypertext transfer protocol (HTTP) accelerator indicator and the intermediate message comprising the client authentication information;
   receiving, from the web server, a finished message together with web page response information in response to the web page request information when the forwarded client authentication information is valid, wherein the terminal master key and the client authentication information are generated using the proxy random number and a pre-master key encrypted with the authentication information of the web server,
   wherein the web page request information is decrypted with a web server master key,
   wherein the web page response information is generated based on the decrypted web page request information,
   wherein the finished message indicates that a connection between the terminal and the web server is completed, and
   wherein the HTTP accelerator indicator indicates that the web page request information is forwarded together with the intermediate message comprising the client authentication information.

2. The method of claim 1, wherein the proxy server is included in a mobile communication network.

3. The method of claim 1, further comprising:
   obtaining a web access history of the terminal over a mobile communication network; and
   selecting the plurality of web servers to establish a session in advance, based on the web access history including previously accessed web pages, wherein the proxy server is included in the mobile communication network.

4. The method of claim 1, wherein the web page response information is encrypted based on the web server master key.

5. A method for receiving a web service by a terminal through a proxy server, the method comprising:
   sending, to the proxy server, an access request to a web server;
   receiving, from the proxy server, authentication information of the web server and a proxy random number generated by the proxy server, wherein the authentication information of the web server is stored in a database of the proxy server, and wherein authentication information of a plurality of web servers that is selected based on a web access history including previously accessed web pages is included in the database of the proxy server;
   generating client authentication information, an intermediate message comprising the client authentication information, and web page request information encrypted with a terminal master key;
   transmitting, to the proxy server, the web page request information encrypted with a terminal master key and the intermediate message comprising the client authentication information, wherein the web page request information together with a hypertext transfer protocol (HTTP) accelerator indicator and the intermediate message comprising the client authentication information are forwarded to the web server; and
   receiving, from the proxy server, a finished message together with web page response information in response to the web page request information when the forwarded client authentication information is valid,
   wherein the terminal master key and the client authentication information are generated using the proxy random number and a pre-master key encrypted with the authentication information of the web server,
   wherein the web page request information is decrypted with a web server master key,
   wherein the web page response information is generated based on the decrypted web page request information,
   wherein the finished message indicates that a connection between the terminal and the web server is completed, and wherein the HTTP accelerator indicator indicates that the web page request information is forwarded together with the intermediate message comprising the client authentication information.

6. The method of claim 5, wherein the proxy server is included in a mobile communication network.

7. The method of claim 5, wherein the web page response information is encrypted using the web server master key.

8. A proxy server for providing a web service, the proxy server comprising:
   a controller configured to:
      obtain, by the proxy server, authentication information from each of a plurality of web servers, and store the obtained authentication information of the plurality of the web servers in a database;
      receive, from a terminal, an access request to a web server of the plurality of the web servers;
      retrieve, by the proxy server, corresponding authentication information of the web server from the stored authentication information of the plurality of the web servers in the database; and
      generate, by the proxy server, a proxy random number representing a replacement value of a random number created by the web server; and
   a transceiver configured to:
      transmit, to the terminal, the proxy random number and the corresponding authentication information of the web server;
      receive, from the terminal, an intermediate message comprising client authentication information and web page request information encrypted with a terminal master key;
      forward, to the web server, the web page request information together with a hypertext transfer protocol (HTTP) accelerator indicator and the intermediate message comprising the client authentication information; and
      receive, from the web server, a finished message together with web page response information in response to the web page request information when the forwarded client authentication information is valid,
   wherein the terminal master key and the client authentication information are generated using the proxy random number and a pre-master key encrypted with the authentication information of the web server,
   wherein the web page request information is decrypted with a web server master key,
   wherein the web page response information is generated based on the decrypted web page request information,
   wherein the finished message indicates that a connection between the terminal and the web server is completed, and
   wherein the HTTP accelerator indicator indicates that the web page request information is forwarded together with the intermediate message comprising the client authentication information.

9. The proxy server of claim 8, wherein the proxy server is included in a mobile communication network.

10. The proxy server of claim 8, wherein the web page response information is encrypted based on the web server master key.

11. A terminal for receiving a web service through a proxy server, the terminal comprising:
   a transceiver configured to:
      send, to the proxy server, an access request to a web server; and
      receive, from the proxy server, authentication information of the web server and a proxy random number generated by the proxy server, wherein the authentication information of the web server is stored in a database of the proxy server, and wherein authentication information of a plurality of web servers that is selected based on a web access history including previously accessed web pages is included in the database of the proxy server; and
   a controller configured to:
      generate client authentication information, an intermediate message comprising the client authentication information, and web page request information encrypted with a terminal master key,
   wherein the transceiver is further configured to:
      transmit, to the proxy server, the web page request information encrypted with a terminal master key and the intermediate message comprising the client authentication information, wherein the web page request information together with a hypertext transfer protocol (HTTP) accelerator indicator and the intermediate message comprising the client authentication information are forwarded to the web server; and
      receive, from the proxy server, a finished message together with web page response information in response to the web page request information when the forwarded client authentication information is valid,
   wherein the terminal master key and the client authentication information are generated using the proxy random number and a pre-master key encrypted with the authentication information of the web server,
   wherein the web page request information is decrypted with a web server master key,
   wherein the web page response information is generated based on the decrypted web page request information,
   wherein the finished message indicates that a connection between the terminal and the web server is completed, and
   wherein the HTTP accelerator indicator indicates that the web page request information is forwarded together with the intermediate message comprising the client authentication information.

12. The terminal of claim 11, wherein the proxy server is included in a mobile communication network.

13. The terminal of claim 11, wherein the web page response information is encrypted using the web server master key.

* * * * *